US005688435A

United States Patent [19]

Chang et al.

[11] Patent Number: 5,688,435

[45] Date of Patent: Nov. 18, 1997

[54] PIGMENTED RHEOPECTIC CLEANING COMPOSITIONS WITH THIXOTROPIC PROPERTIES

[75] Inventors: David A. Chang, Waldwick; James W. Cavanagh, Ramsey, both of N.J.

[73] Assignee: Reckitt & Colman Inc., Montvale, N.J.

[21] Appl. No.: 619,864

[22] Filed: Mar. 18, 1996

[30] Foreign Application Priority Data

Aug. 10, 1995 [GB] United Kingdom .................. 9516372

[51] Int. Cl.[6] .......................... C01B 11/06; C01B 11/04; C11D 3/395; C11D 7/54

[52] U.S. Cl. ............................... 252/187.25; 252/187.24; 252/187.26; 252/186.36; 510/191; 510/373; 510/490; 510/503

[58] Field of Search ........................ 252/187.24, 187.25, 252/187.26, 186.36; 510/191, 373, 490, 503

[56] References Cited

U.S. PATENT DOCUMENTS 3,985,668 10/1976 Hartman ................................ 510/369
4,271,030 6/1981 Brierley et al. ..................... 252/187.26
4,474,677 10/1984 Foxlee ................................ 252/187.25
4,552,680 11/1985 Hartman et al. ................... 252/187.25
4,623,476 11/1986 Nayar et al. ............................ 510/303
4,714,562 12/1987 Roselle .................................... 510/221
4,789,495 12/1988 Cahall et al. ........................... 510/373
4,900,467 2/1990 Smith ....................................... 510/195
4,917,814 4/1990 MacIntyre et al. ..................... 510/373
4,952,333 8/1990 Cramer .................................. 252/187.24
5,089,162 2/1992 Rapisanda et al. ..................... 510/101
5,348,682 9/1994 Finley et al. ....................... 252/186.36
5,549,842 8/1996 Chang ...................................... 510/191

FOREIGN PATENT DOCUMENTS 0295053 12/1988 European Pat. Off. .

*Primary Examiner*—Joseph D. Anthony
*Attorney, Agent, or Firm*—Fish & Richardson P.C.

[57] ABSTRACT

A pigmented bleach-containing hard surface cleaner comprises an alkali metal hypochlorite, bentonite clay, a mono-(long chain alkyl)-tertiary amine oxide, an alkali metal salt, a pH stabilizer to attain a pH of 11 or higher, an alkali metal alkyl sarcosinate, an alkylbenzene sulphonate, and an inorganic pigment which is preferably ultramarine blue. The cleaning composition has excellent colour stability as well as phase stability and hypochlorite stability.

6 Claims, 4 Drawing Sheets

PIGMENTED RHEOPECTIC CLEANING COMPOSITIONS WITH THIXOTROPIC PROPERTIES

FIELD OF THE INVENTION

This invention relates to thickened liquid bleach-containing compositions useful for hard surface cleaning, and particularly to such compositions which include bleach-stable pigments.

BACKGROUND OF THE INVENTION

Thickened bleach compositions possess a number of advantages over unthickened bleach compositions. The more viscous, thickened solutions adhere to vertical and inclined surfaces for a longer period of time as compared or disinfectant activity of the thickened compositions is more effective on the intended areas.

To provide a thickened hypochlorite composition having an acceptable shelf-life, the rate of decomposition of alkali metal hypochlorite as well as the phase behaviour of the composition must be considered. As is known, alkali metal hypochlorite degradation may be illustrated by the following equation:

$$NaOCl \leftrightharpoons NaCl + \tfrac{1}{2}O_2$$

Many conventional thickening agents accelerate the degradation of the hypochlorite and thus are problematic for use in hypochlorite compositions. Also, the inclusion of conventional thickening agents and surfactants is difficult because the resulting hypochlorite composition has a tendency to separate into two or more phases, particularly at elevated temperatures. Many thickening agents are themselves unstable in the presence of an alkali metal hypochlorite. Thus, achieving sufficient viscosity in hypochlorite compositions by conventional agents and additives in addition to providing a hypochlorite composition having acceptable stability is difficult.

It is also desirable, for commercial and aesthetic reasons, to provide thickened bleach-containing cleaner compositions which have distinctive coloration. The realm of bleach stable colourants is fairly small due to the tendency of organic dyes to degrade in the presence of strong oxidizers.

U.S. Pat. No. 4,474,677 (Foxlee) suggests the use of certain halogenated copper phthalocyanine pigments for aqueous alkali metal hypochlorite compositions. While this class of pigments is considered to be bleach-stable, slow degradation of the pigment molecule releases copper which catalyzes the degradation of hypochlorite. U.S. Pat. No. 4,271,030 (Brierley) describes a suspension of ultramarine blue using calcium soap floes. Use of calcium soap flocs is not desirable due to the high concentration required, 50% by volume of the composition, or from a cleaning standpoint due to a tendency to precipitate onto hard surfaces. U.S. Pat. No. 4,952,333 (Cramer) describes a bleaching and brightening composition using polymers to suspend ultramarine blue in an emulsified polymer matrix. This composition however would not be an effective hard surface cleaner due to its low detergency. U.S. Pat. No. 4,917,814 (MacIntyre) describes the use of cobalt aluminate to colour thickened hypochlorite solutions. Cobalt pigments were found to be superior to ultramarine blue for suspension properties. While this is not disputed, it should be pointed out that, under higher temperature conditions than employed in MacIntyre, surfactant thickened compositions will lose viscosity and allow sedimentation of the pigment. Consumer products require stability when exposed to these higher temperatures during distribution and storage.

SUMMARY OF THE INVENTION

This invention provides thickened hypochlorite compositions with enhanced rheological properties which are capable of stably suspending inorganic pigments. The thickening system is a blend of surfactants and clay that is rheopectic at low shear rates, which helps to stably suspend the pigment, but thixotropic at higher shear rates, which allows the product to dispense easily from a container to aid in the cleaning of hard surfaces. By definition, rheopexy and thixotropy are opposite flow properties. Having both properties present in a single fluid is quite advantageous.

Non-limiting examples of inorganic colourants that can be utilized, include ultramarine blue, cobalt aluminate blue, titanium dioxide and calcium carbonate. This invention focuses on the use of ultramarine blue which is preferred due to its consumer appeal, low toxicity, and colour intensity compared to other pigments.

The composition behaves as a highly structured liquid and exhibits some unique and unexpected flow properties. This occurs despite the low solids content, less than 10%, of the formula as compared to other structured liquids, some of which are known in the category of liquid laundry, detergents. This characteristic helps to solve the problem of pigment sedimentation while still maintaining thin fluid flow properties which help to achieve good surface coverage for products such as liquid toilet bowl cleaners. The composition also has good phase-stability and hypochlorite-stability.

The compositions of this invention comprise:

(a) an alkali metal hypochlorite, preferably sodium hypochlorite, (b) bentonite clay, (c) a tertiary amine oxide having one long-chain alkyl group of from 10 to 16 carbon atoms and two lower alkyl groups, (d) an alkali metal salt, preferably sodium chloride, (e) a pH stabilizer to provide a pH of 11 or higher, (f) an alkali metal $C_{10}$-$C_{16}$ alkyl sarcosinate, (g) a $C_{10}$-$C_{14}$ straight chain alkylbenzene sulphonate, and (h) an inorganic pigment, preferably ultramarine blue.

The desired rheological properties and phase stability described above are achieved through the careful blending of clay, surfactants and electrolytes. In particular, the molar ratio of the tertiary amine oxide (c) to the alkylbenzene sulphonate (g) should range from about 5:1 to about 11:1. Useful non-pigmented compositions analogous to the compositions of this invention can be prepared without the pigment (h).

The viscosity of the composition can range from about 200 cps to about 1000 cps. The preferred range is from about 300–500 cps.

DETAILED DISCLOSURE

Figure 1:
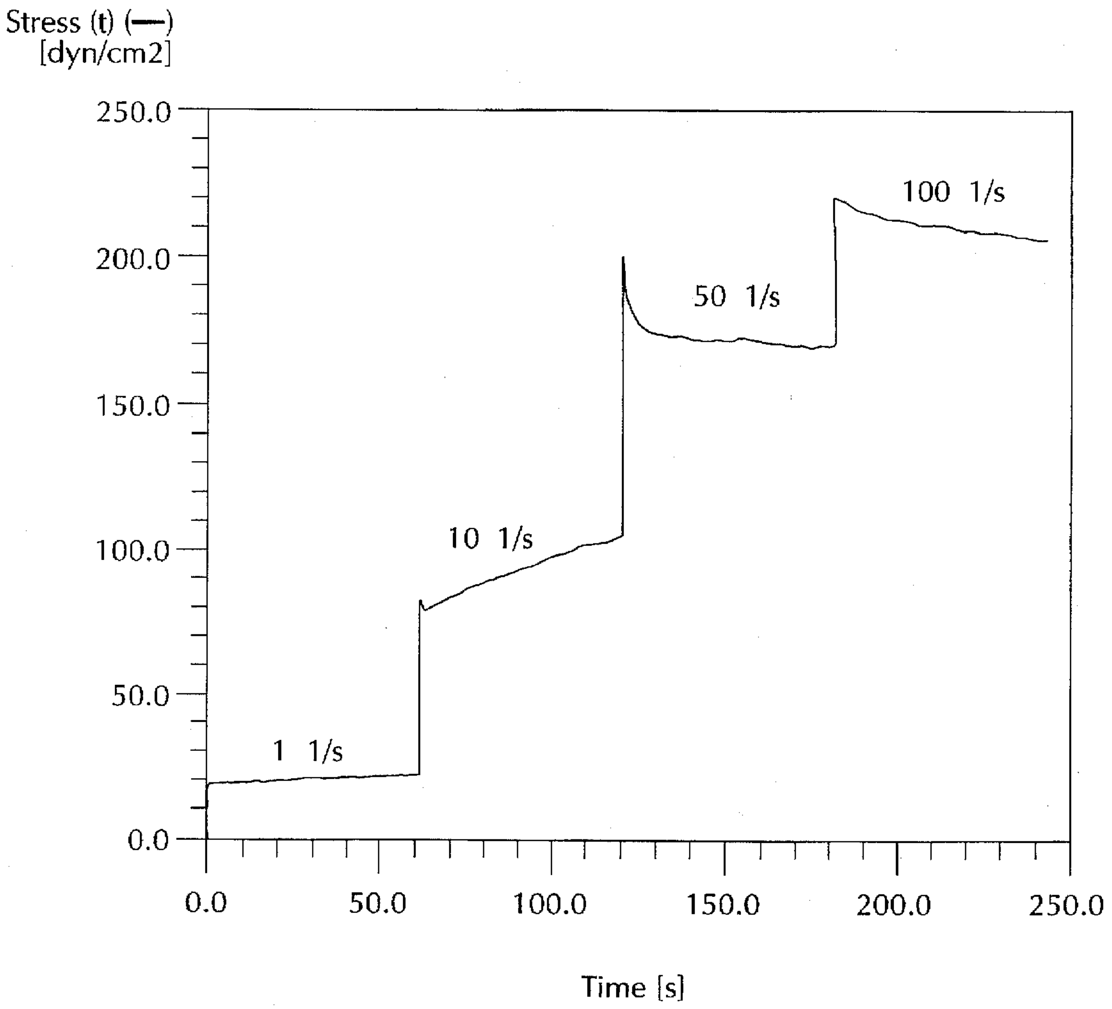
FIGS. 1 and 2 are graphs showing the theological properties of a preferred embodiment of this invention.

The inventive composition is a hypochlorite stable, single phase, thickened hypochlorite bleach composition capable of adhering to vertical or inclined surfaces longer than thinner compositions. The composition is an effective agent for stain and soil removal as well as disinfection. The high level of hypochlorite stability and single solution phase behaviour of the composition enables the composition to have an acceptable shelf life. The compositions include also an inorganic pigment in suspension. In these pigmented compositions, the colour stability, particularly where the pigment is ultramarine blue, is uniquely advantageous.

Preferably the alkali metal of the alkali metal hypochlorite is selected from lithium, potassium or sodium. For purposes of cost and availability, sodium hypochlorite is currently preferred. The alkali metal hypochlorite may have other by-products of the manufacturing process present without adversely affecting the composition. The amount of alkali metal hypochlorite employed is within the range of about 0.5 weight % to about 10 weight %, preferably from 1.0 weight % to 5.0 weight %, and more preferably from 1.5 weight % to 3.0 weight %.

Bentonite clay is a colloidal hydrated aluminum silicate clay found in North America. It consists principally of montmorillonite ($Al_2O_3.4SiO_2.H_2O$) and usually also contains some magnesium, iron and calcium carbonate. Bentonite clay is preferred for use in the compositions of this invention, but other clays of similar structure and/or properties may be used. The mount of Bentonite clay in the composition should range from about 0.15 weight % to about 1.5 weight %, preferably from 0.25 weight % to 1.0 weight %.

The tertiary amine oxide is of the formula:

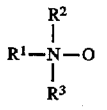

wherein $R^1$ is an alkyl group containing from about 10 to about 16 carbon atoms and each of $R^2$ and $R^3$ is a lower alkyl group containing from 1 to 3 carbon atoms. $R^1$, $R^2$ and $R^3$ may be a straight or branched chain; $R^1$ may contain an odd or an even number of carbon atoms. Amine oxides of mixed chain length may be used, which may contain a predominance of one or more chain lengths. Preferably, the tertiary amine oxide is selected from myristyldimethylamine oxide, lauryldimethylamine oxide, and mixtures thereof. Most preferably employed is myristyldimethylamine oxide. The amount of the tertiary amine oxide employed is preferably in the range from about 0.5 weight % to about 2.5 weight %, more preferably from 0.9 weight % to 1.8 weight %, and most preferably from 1.0 weight % to 1.5 weight %.

The alkali metal salt may be selected from any number of water-soluble alkali metal salts and mixtures thereof, with the alkali metal preferably being lithium, potassium, or sodium, and the anion ion preferably being a halide (such as chloride, fluoride, bromide and iodide). More preferably the alkali metal salt is selected from the group consisting of sodium chloride, lithium chloride, potassium chloride, and mixtures thereof. For proposes of cost and availability, the alkali metal salt most preferred is sodium chloride and may be used in varying amounts to reduce hypochlorite degradation, limited only by the avoidance of a "salting out" of the solution (where the surfactants become insoluble in water). When sodium chloride is used, the preferred amount is in the range of about 0.25 weight % to about 2.0 weight %, preferably from 0.5 weight % to 1.5 weight %.

An alkali metal hydroxide is the preferred pH stabilizer included in the composition, although any pH stabilizer may be employed as long as the stability and viscosity of the composition are not adversely affected. Other pH stabilizers which may be used, for example, include carbonate buffers. The alkali metal of the preferred hydroxide may be lithium, potassium, or sodium. Sodium hydroxide and potassium hydroxide are particularly useful pH stabilizers due to cost and availability, with sodium hydroxide most preferred. The alkali metal hydroxide is included in the composition in an effective amount to adjust the composition to a pH level of at least about 11, more preferably from 12 to 13.5, and most preferably within the range from 12 to 13.

The alkali metal alkyl sarcosinate may be represented by the formula:

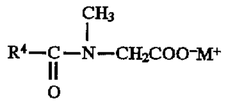

wherein $R^4$ is a branched or straight chain $C_{10}$-$C_{16}$ alkyl group and M is an alkali metal cation (such as lithium, potassium or sodium). Sodium lauroyl sarcosinate is most preferred. The amount of alkali metal alkyl sarcosinate that may be used preferably ranges from about 0.10 weight % to about 0.75 weight %, more preferably 0.12 weight % to 0.60 weight %, and most preferably from 0.15 weight to 0.30 weight %.

The alkali metal $C_{10}$ to $C_{14}$ straight chain alkylbenzene sulphonate is preferably defined wherein the alkali metal is potassium, lithium, or sodium. Most preferably employed is sodium dodecylbenzene sulphonate. Preferably the amount of sulphonate used is within the range of from about 0.08 weight % to about 0.8 weight %, more preferably from 0.1 weight % to 0.5 weight %, and most preferably from 0.15 weight % to 0.4 weight %.

In these pigmented compositions, the preferred pigment is ultramarine blue which is an inorganic silicate. Although this material is inert to hypochlorite oxidation and does not catalyze decomposition of hypochlorite, it is insoluble and requires suspension in the hypochlorite solution. Such suspension cannot be achieved merely by dispensing particles of ultramarine blue in hypochlorite solution, because the pigment has a density of 2.35 and settles out even when it is of very free particle size. The thickening system employed in the composition of this invention provides excellent suspension for ultramarine blue pigment particles. The amount of ultramarine blue in the composition of this invention ranges from about 0.01 weight % to about 0.50 weight %, preferably about 0.05 weight %.

The molar ratio of the tertiary amine oxide to alkali metal alkylbenzene sulphonate should fall within the range of from about 5:1 to about 11: 1. Preferably, the molar ratio is from 6:1 to 10:1, and more preferably from 7:1 to 9:1.

The composition offers improved viscosity for alkali metal hypochlorite bleaches while at the same time providing a commercially acceptable pigmented composition with excellent colour stability. Although not wishing to be bound to any particular theory, it is believed that the primary interaction is between the clay and the amine oxide components of the formula. In the preferred embodiment of the example set forth below, the combination of the clay, sodium chloride, and the sodium hydroxide in solution causes the clay platelets to align in an edge-to-face structure. Some of the amine oxide acts to stabilize the structure through both ionic and steric interaction. Sulphonate and sarcosinate surfactants combine with the remaining amine oxide to form organic structures or micelles which boost viscosity. It is further theorized that these micelles interact with the clay structure to develop the unique rheology of the composition.

This invention provides a commercially advantageous coloured thickening system which exhibits thixotropic properties for easy dispensing, particularly from a spray container. Cleaning products employing this thickening system have a sufficiently high level of quiescent viscosity to keep the inorganic pigment particles in suspension.

The invention will be better understood by reference to the following examples which are included for the propose of illustration, and are not be be construed as limitations.

EXAMPLE 1

A blue-pigmented hand surface cleaner was prepared which had the following ingredients, all percentages being by weight.

| Ingredient | |
|---|---|
| bentonite clay (Gelwhite H) | 1.00% |
| ultramarine blue | 0.05% |
| sodium chloride | 1.00% |
| sodium hydroxide | 2.50% |
| myristyldimethylamine oxide | 5.60% |
| sodium hypochlorite | 2.50% |
| sodium dodecylbenzene sulphonate | 0.72% |
| sodium lauroyl sarcosinate | 1.00% |
| fragrance | 0.065% |
| deionized water | q.s. to 100% |

The cleaner composition was prepared by dispensing in the main vessel (1) Gelwhite H, a montmorillonite clay (Southern Clay Products) in water, using a homogenizer until the clay is fully hydrated, and adding the Ultramarine blue with further agitation. In a separate vessel (2), sodium chloride and a 25% solution of sodium hydroxide were dissolved in water. The contents of vessel (2) were added to vessel (1) with high agitation. The remaining ingredients were added, with agitation, in the following order: Atomonyx MO, a 30% solution of myristyldimethylamine oxide, Stepan Company; fragrance; a 16.67% solution of sodium hypochlorite bleach; Biosoft D-40, a 40% solution of sodium dodecylbenzene sulphonate, Stepan Company; and Hamposyl L-30, a 30% solution of sodium lauroyl sarcosinate, W. R. Grace & Company.

Figure 2:
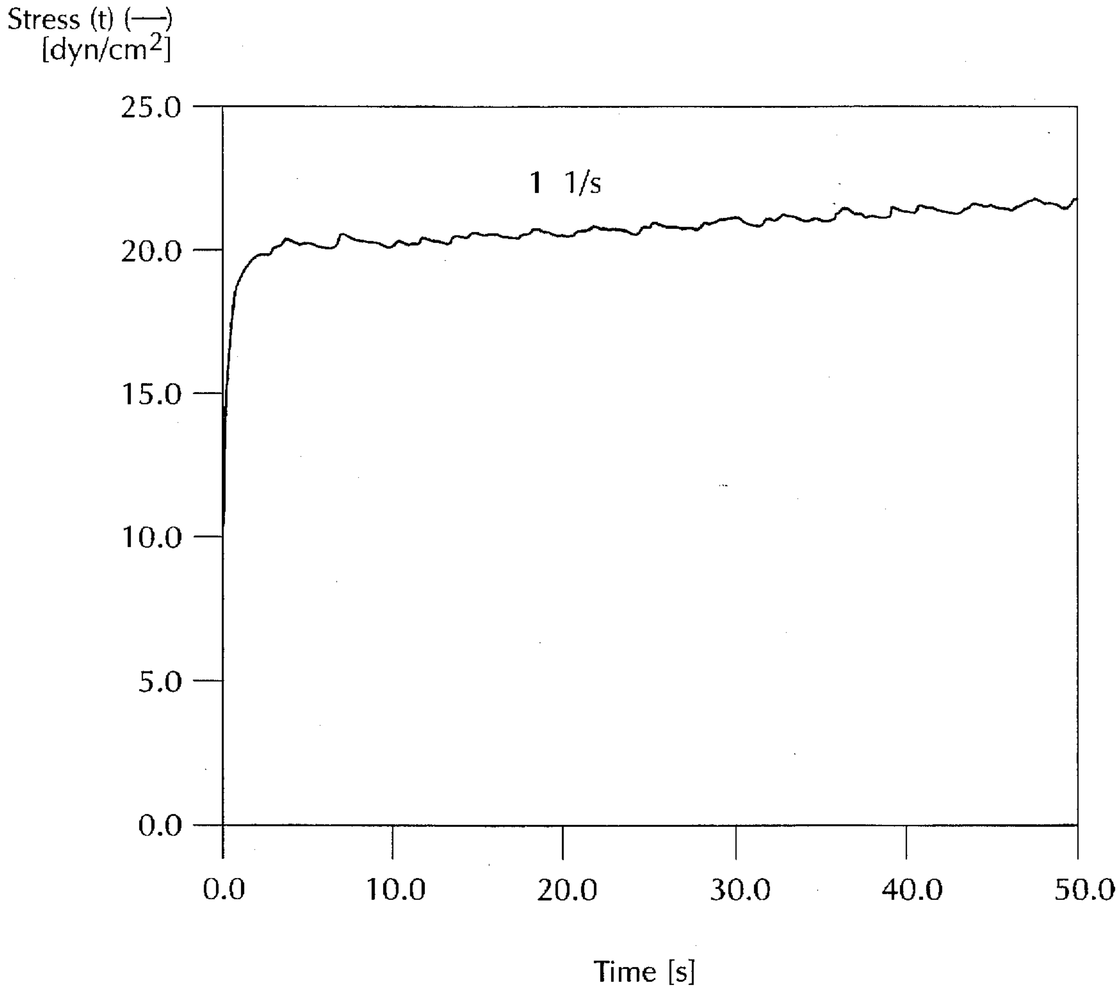

FIG. 1 shows the rheology profile of this preferred embodiment. It summarizes the shear stress as a function of time at four shear rates. The formula appears to be rheopectic at both 1 and 10 sec q, under conditions of constant shear. The thixotropic character is evident at 50 $sec^{-1}$. FIG. 2 captures the stress growth behaviour at the inception of flow at the first shear rate, 1 $sec^{-1}$. Testing was conducted with the Rheometrics Scientific RFSII rheometer, 50 mm parallel plate, 0.9 mm spacing, 316SS tooling, 25C, 0.002–10 gr-cm force rebalance.

Figure 3:
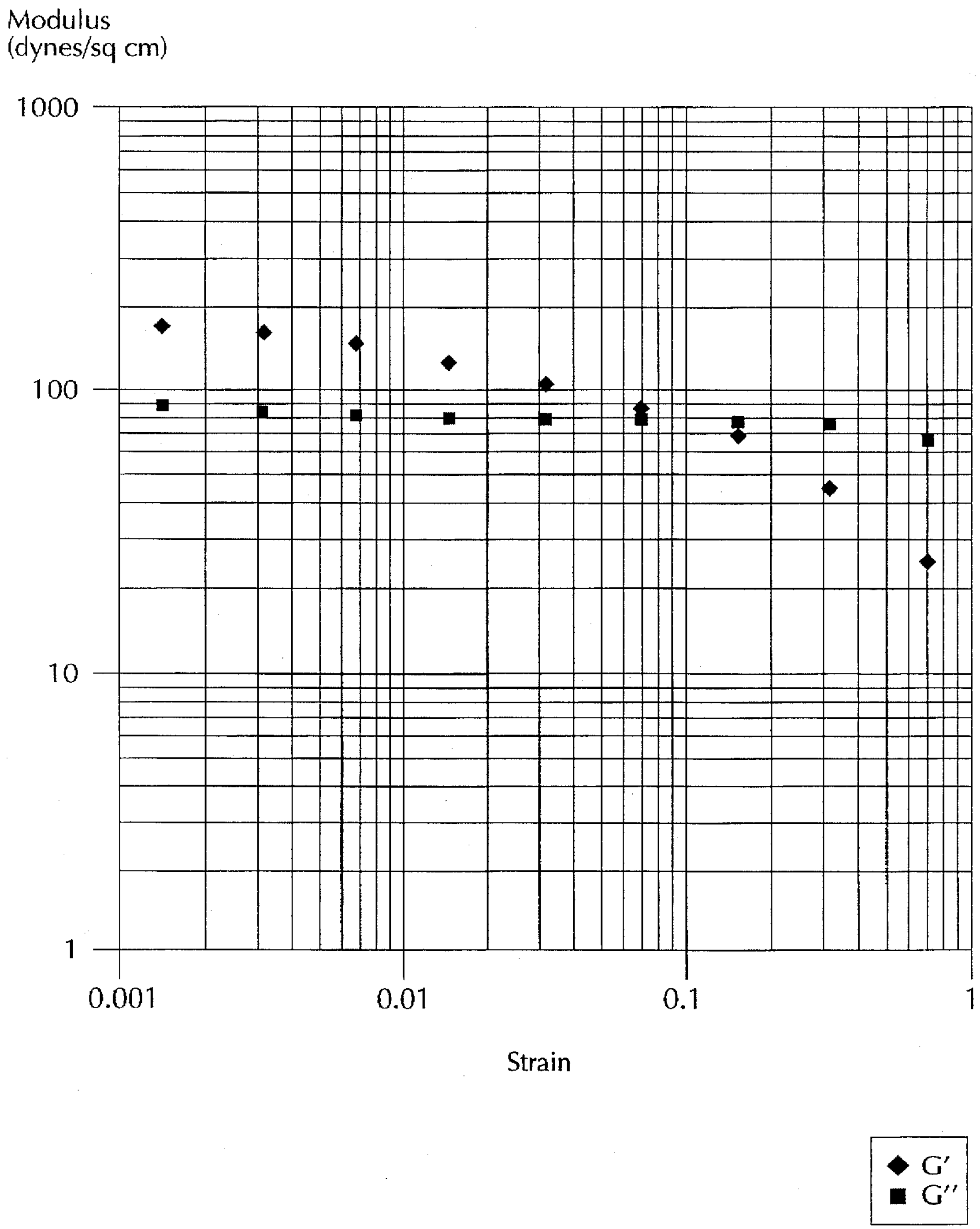
FIGS. 3 and 4 are graphs showing certain rheological properties of a formulation according to this invention (FIG. 3) and comparable properties of a similar composition without the clay (FIG. 4).
Figure 4:
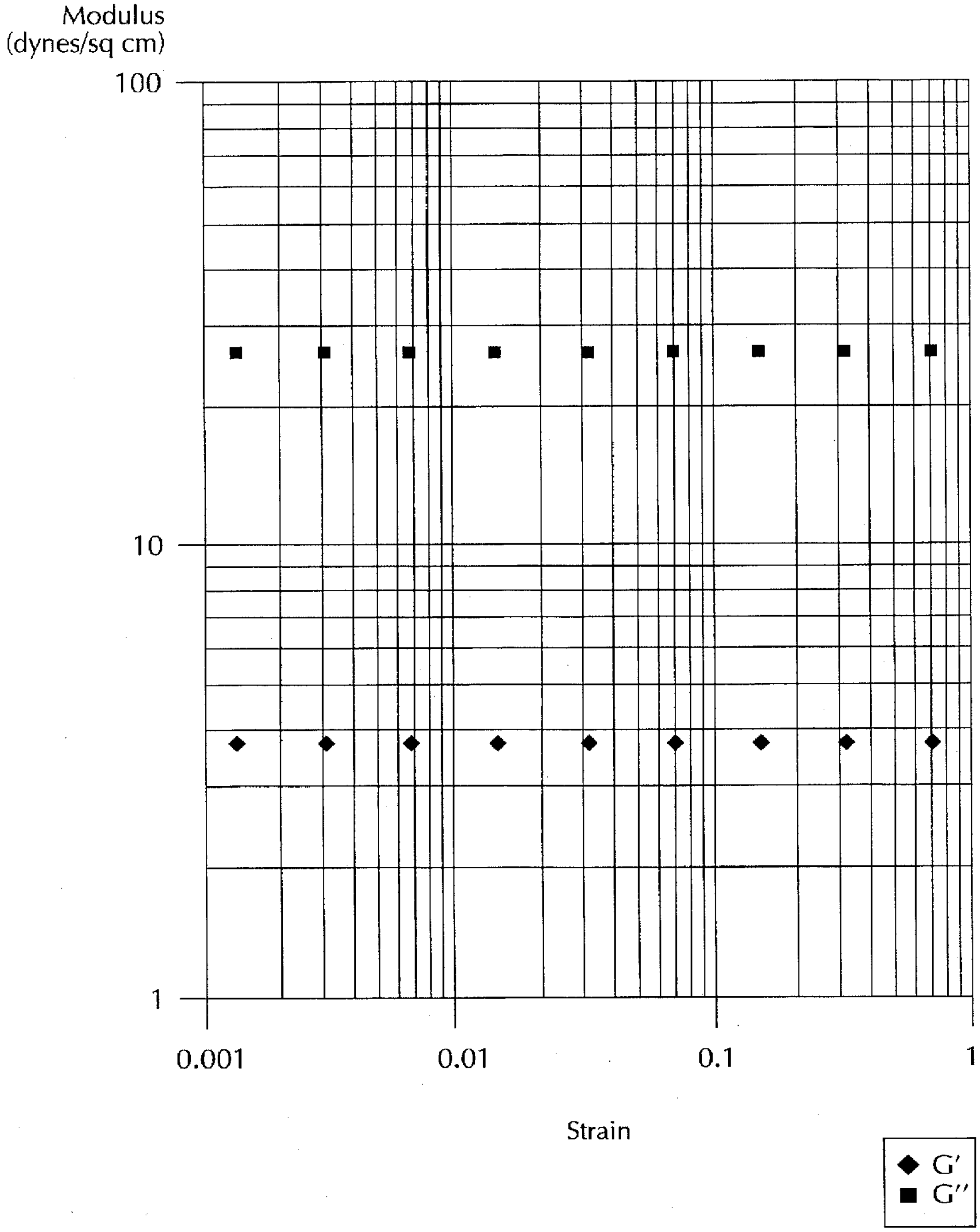

An analogous formula without the clay and pigment components exhibits dramatically different rheological properties. See FIGS. 3 and 4. In the examination of plots of G', a measure of the elastic strength of a viscoelastic fluid, and G", a measure of the mechanical energy dissipated during the deformation of structured fluid, the formula with clay behaves as a highly structured fluid with significant strain dependence. The analogous formula behaves as a predominantly viscous fluid with no significant strain dependence. This difference indicates a significant interaction between the clay component and the surfactants present in the formulation.

EXAMPLES 2–5

Following the procedure of Example 1, the following additional compositions were prepared:

| Ingredient | Example 2 % | Example 3 % | Example 4 % | Example 5 % |
|---|---|---|---|---|
| Montmorillonite (Gelwhite H) | 1.00 | 1.00 | 1.00 | 1.00 |
| Ultramarine Blue | 0.05 | 0.05 | 0.05 | 0.05 |
| Sodium Chloride | — | 1.00 | — | 1.00 |
| Potassium Chloride | — | — | 1.27 | — |
| Sodium Hydroxide (25% aq.) | 2.50 | 2.50 | — | 2.500 |
| Potassium Hydroxide | — | — | 0.88 | — |
| Myristyldimethylamine oxide (30%) | 5.60 | 4.20 | 5.60 | 5.60 |
| Lautyldimethylamine Oxide (30% | — | 1.40 | — | — |
| Sodium Hypochlorite | 2.50 | 2.50 | 2.50 | 2.50 |
| Sodium Lauroyl Sarcosinate (30%) | 1.00 | 1.00 | 1.00 | — |
| Sodium Myristyl Sarcosinate (30%) | — | — | — | 1.10 |
| Sodium Dodecylbenzene Sulfonate (30%) | 0.72 | 0.72 | 0.72 | 0.72 |
| Fragrance | 0.07 | 0.07 | 0.07 | 0.07 |
| Deionized Water | q.s. to 100 | q.s. to 100 | q.s. to 100 | q.s. to 100 |

Comparative Example

A cleaning composition containing ultramarine blue pigment, but without bentonite clay was prepared, and the pigment-settling characteristics were compared with the composition of Example 1. The comparative composition was prepared using the method of Example 1. The two compositions were maintained in a quiescent state for a period of six weeks at 40° C. The following table shows the ingredients of the compositions and the relevant rheological data.

TABLE

| Ingredient | Example 1 | Comparative Example |
|---|---|---|
| bentonite clay | 1.00% | — |
| ultramarine blue | 0.05% | 0.025% |
| sodium chloride | 1.00% | 1.00% |
| sodium hydroxide | 2.50% | 2.60% |
| myristyldimethylamine oxide (30%) | 5.60% | 6.20% |
| sodium hypochlorite | 2.50% | 2.50% |
| sodium dodecylbenzene sulphonate (40%) | 0.72% | 0.80% |
| sodium lauroylsarcosinate (30%) | 1.00% | 1.00% |
| fragrance | 0.065% | 0.075% |
| deionized water | q.s. to 100% | q.s. to 100% |
| viscosity | 464 | 448 |
| pigment settling | none after 6 weeks | settled during 3rd week |

These data show that, in contrast to the excellent suspension characteristics of Example 1, in the Comparative Example, which contains only half the amount of pigment, settles out within three weeks.

We claim:

1. A thickened pigmented aqueous hypochlorite composition comprising, on a weight basis:

(a) from 0.5% to 10% of an alkali metal hypochlorite;

(b) from 0.25% to 1% of bentonite clay;

(c) from 0.5% to 2.5% of a tertiary amine oxide of the formula

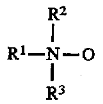

wherein $R^1$ is alkyl of from 10 to 16 carbon atoms, and each of $R^2$ and $R^3$ is alkyl of from 1 to 3 carbon atoms;

(d) from 0.25% to 2.0% of an alkali metal salt;

(e) a pH stabilizer in sufficient amount to provide a pH of 11 or higher;

(f) from 0.10% to 0.75% of an alkali metal sarcosinate of the formula

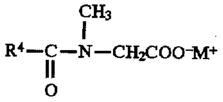

wherein $R^4$ is a straight chain alkyl of from 10 to 16 carbon atoms and M is lithium, sodium or potassium;

(g) from 0.08 to 0.80% of an alkali metal alkylbenzene sulphonate in which the alkyl group is straight chained and has from 10 to 14 carbon atoms; and (h) from 0.01% to 0.5% of an inorganic pigment wherein the molar ratio of (c) to (g) ranges from 5:1 to 11:1, and the viscosity of the said composition is from 200 to about 1000 cps.

2. A hypochlorite composition according to claim 1 in which (h) the pigment is ultramarine blue.

3. A hypochlorite composition according to claim 2 in which:

(a) the alkali metal hypochlorite is sodium hypochlorite, (c) the amine oxide is lauryldimethylamine oxide, myristyldimethylamine oxide or mixtures thereof, (d) the alkali metal salt is sodium chloride, (e) the pH stabilizer is sodium hyroxide in sufficient amount to provide a pH of from 12 to 13.5, (f) the sarcosinate is sodium lauroyl sarcosinate, (g) the alkali metal alkylbenzene sulphonate is sodium dodecylbenzene sulphonate.

4. A hypochlorite composition according to claim 3 in which (c) the amine oxide is lauryldimethylamine oxide.

5. A hypochlorite composition according to claim 1 which comprises, by weight (a) from 1% to 5% sodium hypochlorite, (b) from 0.25% to 1% bentonite clay, (c) from 0.9% to 1.8% lauryldimethylamine oxide, (d) from 0.5% to 1.5% sodium chloride, (f) from 0.12% to 0.60% sodium lauroyl sarcosinate, (g) from 0.10% to 0.50% sodium dodecylbenzene sulphonate, and (h) about 0.05% ultramarine blue pigment, wherein the molar ratio of (c) to (g) is from 6:1 to 10:1.

6. A hypochlorite composition according to claim 5 which comprises, by weight (a) from 1.5% to 3.0% sodium hypochlorite, (c) from 1.0% to 1.5% lauryldimethylamine oxide, (f) from 0.15% to 0.30% sodium lauroyl sarcosinate, and (g) from 0.15% to 0.40% sodium dodecylbenzene sulphonate, wherein the molar ratio of (c) to (g) ranges from 7:1 to 9:1.

* * * * *